(12) United States Patent
Hakamata et al.

(10) Patent No.: US 9,696,099 B2
(45) Date of Patent: Jul. 4, 2017

(54) HEAT EXCHANGER WITH SEALING MEMBER AND PROTRUSION BETWEEN CORE PLATE AND HEADER

(75) Inventors: Osamu Hakamata, Toyohashi (JP); Yoshinori Ishihara, Nishio (JP); Hirotaka Ishikawa, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 448 days.

(21) Appl. No.: 13/343,120

(22) Filed: Jan. 4, 2012

(65) Prior Publication Data
US 2012/0175096 A1  Jul. 12, 2012

(30) Foreign Application Priority Data

Jan. 6, 2011  (JP) .................................. 2011-001361

(51) Int. Cl.
*F28F 9/02* (2006.01)
*B29C 45/14* (2006.01)
*B29L 31/18* (2006.01)

(52) U.S. Cl.
CPC ...... *F28F 9/0226* (2013.01); *B29C 45/14336* (2013.01); *B29C 45/14418* (2013.01);
(Continued)

(58) Field of Classification Search
CPC ...... F28F 9/0226; F28F 9/0229; F28F 9/0224; F28F 9/0251; F28F 9/0248; F28F 9/0241; B23P 15/26
(Continued)

(56) References Cited

U.S. PATENT DOCUMENTS 4,544,029 A * 10/1985 Cadars ......................... 165/149
4,997,035 A *  3/1991 Beatenbough ........ F28F 9/0226
                                                    165/149
(Continued)

FOREIGN PATENT DOCUMENTS

EP  0779488       6/1997
EP  1503165 A2   2/2005
(Continued)

OTHER PUBLICATIONS

Office action dated Dec. 10, 2013 in corresponding Japanese Application No. 2011-001361.

*Primary Examiner* — Jianying Atkisson
*Assistant Examiner* — Harry Arant
(74) *Attorney, Agent, or Firm* — Harness, Dickey & Pierce, P.L.C.

(57) ABSTRACT

A heat exchanger includes a core portion, a pair of header tanks, and an elastically-deformable sealing member. The header tanks are arranged on both end sides of the core portion. The header tank includes a core plate and a resin tank body, which define a tank space. The sealing member is disposed at an end part of the tank body located adjacent to the core plate. The sealing member has a loop shape to enclose the tank space when viewed from the core portion and is formed integrally with the end part of the tank body. The end part of the tank body includes a protrusion portion at least one of inward and outward of the sealing member. The protrusion portion encloses the tank space when viewed from the core portion and projects from the end part of the tank body toward the core plate.

19 Claims, 4 Drawing Sheets

(52) U.S. Cl.
CPC . *B29C 2045/14459* (2013.01); *B29L 2031/18* (2013.01); *F28F 2255/143* (2013.01); *Y10T 29/49389* (2015.01)

(58) Field of Classification Search
USPC .......................................... 165/173, 149, 172
See application file for complete search history.

(56) References Cited

U.S. PATENT DOCUMENTS

| | | | |
|---|---|---|---|
| 5,160,474 A | | 11/1992 | Huff |
| 5,979,546 A | * | 11/1999 | Stolarski et al. ............. 165/173 |
| 7,779,893 B2 | | 8/2010 | Leitch et al. |
| 2005/0039894 A1 | | 2/2005 | Brost et al. |
| 2008/0053645 A1 | * | 3/2008 | Hakamata ............ F28F 9/0226 |
| | | | 165/173 |

FOREIGN PATENT DOCUMENTS

| | | | | |
|---|---|---|---|---|
| JP | S-53-150556 | | 5/1952 | |
| JP | 57-061387 | | 9/1955 | |
| JP | S-62-136790 | | 8/1987 | |
| JP | S-64-046684 | | 3/1989 | |
| JP | 03-138116 | | 6/1991 | |
| JP | 03-158698 | | 7/1991 | |
| JP | 07-024871 | | 1/1995 | |
| JP | 2008057849 A | * | 3/2008 | ............ F28F 9/0226 |
| WO | WO 2008/030015 | | 3/2008 | |

* cited by examiner

HEAT EXCHANGER WITH SEALING MEMBER AND PROTRUSION BETWEEN CORE PLATE AND HEADER

CROSS REFERENCE TO RELATED APPLICATION

This application is based on and incorporates herein by reference Japanese Patent Application No. 2011-001361 filed on Jan. 6, 2011.

BACKGROUND OF THE INVENTION

1. Field of the Invention

The present invention relates to a heat exchanger and a method of making the heat exchanger, and is effectively applied to a heat exchanger disposed in a vehicle.

2. Description of Related Art

Conventionally, a header tank of a heat exchanger such as a radiator includes a metallic core plate and a resin tank body, which are integrated with each other. Tubes are joined to the metallic core plate, and the tank body defines a tank space. The core plate and the tank body hold a packing (sealing member) made of an elastic material, such as rubber, therebetween. The packing seals between the core plate and the tank body by compressing the packing between the core plate and the tank body. However, it is difficult to automate a process of attaching the packing to the tank body or the core plate, because the packing is soft and large in size.

For the measures against this, an attaching method is proposed (see, e.g., WO2008/030015) for automating the process of attaching the packing to the tank body. In the method, the tank body is inserted into a molding die, and then the tank body and the packing are integrally formed with each other. By the method, the packing can be formed integrally with the tank body with a high degree of dimension accuracy.

However, by the method described in WO2008/030015, there is a problem of burr generation. Specifically, a rubber material for molding the packing may leak from an interspace between the tank body and the molding die, because the rubber material is injected into a cavity of the molding die with high pressure. Thus, the leakage of the rubber material causes the burr generation.

In order to prevent the burr generation, a size of the interspace between the tank body and the molding die needs to be limited to a few micrometers. To this end, the die clamping force on the tank body and the molding die needs to be high. However, if the mold die clamping force is high, the tank body, which is made of resin, may deform.

SUMMARY OF THE INVENTION

The present invention addresses at least one of the above disadvantages.

According to the present invention, there is provided a heat exchanger, which includes a core portion, a pair of header tanks, and an elastically-deformable sealing member. The core portion includes a plurality of tubes in which fluid flows. The pair of header tanks is arranged on both end sides of the core portion in a longitudinal direction of the plurality of tubes and extends in a direction perpendicular to the longitudinal direction of the plurality of tubes. Each of the pair of header tank includes a core plate joined to the plurality of tubes, and a tank body made of resin. The core plate and the tank body define a tank space communicating with the plurality of tubes. The sealing member is disposed at an end part of the tank body located adjacent to the core plate. The sealing member has a loop shape to enclose the tank space when viewed from the core portion and is formed integrally with the end part of the tank body. The end part of the tank body includes a protrusion portion at least one of inward and outward of the sealing member. The protrusion portion is formed to enclose the tank space when viewed from the core portion and projects from the end part of the tank body toward the core plate.

According to the invention, there is also provided a method for making a heat exchanger. The heat exchanger includes a core portion and a pair of header tanks. The core portion includes a plurality of tubes in which fluid flows. The pair of header tanks is arranged on both end sides of the core portion in a longitudinal direction of the plurality of tubes and extends in a direction perpendicular to the longitudinal direction of the plurality of tubes. Each of the pair of header tank includes a core plate joined to the plurality of tubes, and a tank body made of resin. The core plate and the tank body define a tank space communicating with the plurality of tubes. According to the method, a first process is performed. In the first process, a protrusion portion is formed at an end part of the tank body located adjacent to the core plate, such that the protrusion portion encloses the tank space when viewed from the core portion and projects from the end part of the tank body toward the core plate. Furthermore, a second process is performed. In the second process, the end part of the tank body is inserted into a molding die. Moreover, a third process is performed. In the third process, the molding die is clamped, so that the protrusion portion at the tank body is crushed by an inner wall surface of the molding die. Additionally, a fourth process is performed. In the fourth process, a resin material is injected into a cavity of the molding die to form a looped elastically-deformable sealing member integrally with the tank body inward or outward of the protrusion portion.

In addition, according to the invention, there is provided a method for making a header tank adapted for a heat exchanger. The header tank includes a core plate and a resin tank body which define a tank space. The tank space of the header tank communicates with a plurality of tubes of the heat exchanger, through which fluid flows. According to the method, a first process is performed. In the first process, a protrusion portion is formed at an end part of the tank body located adjacent to the core plate, such that the protrusion portion encloses the tank space when viewed from the core plate and projects toward the core plate. Furthermore, a second process is performed. In the second process, the end part of the tank body is inserted into a molding die. Moreover, a third process is performed. In the third process, the molding die is clamped, no that the protrusion portion at the tank body is crushed by an inner wall surface of the molding die. Additionally, a fourth process is performed. In the fourth process, a resin material is injected into a cavity of the molding die to form a looped elastically-deformable sealing member integrally with the tank body inward or outward of the protrusion portion.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the invention will be described below referring to FIGS. 1 to 5. In the present embodiment, a heat exchanger of the invention is used for a radiator 1 of a vehicle. The radiator 1 cools engine coolant by heat exchange between the engine coolant and air.

Figure 1:
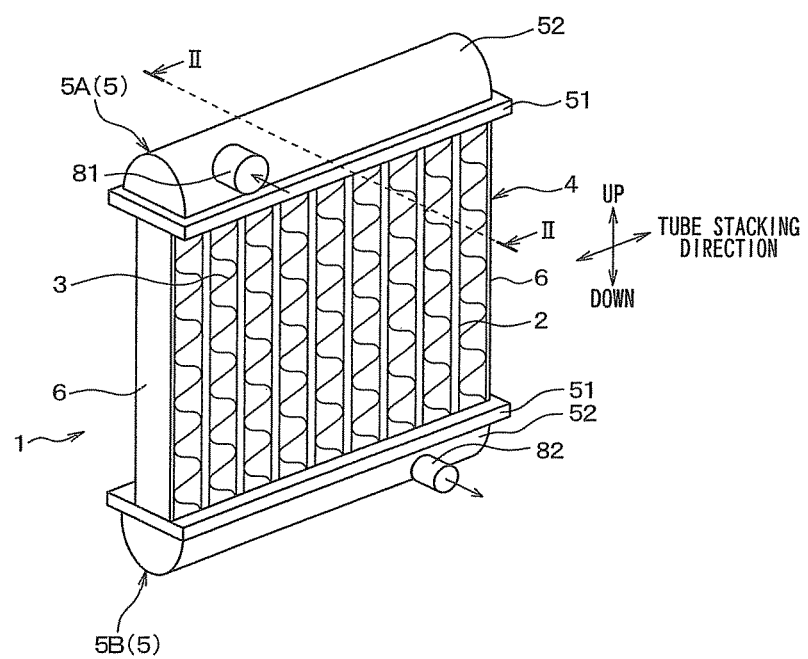
FIG. 1 is a perspective view showing a radiator according to an embodiment of the invention.

As shown in FIG. 1, the radiator 1 of the present embodiment includes a core portion 4 and a pair of header tanks 5. The core portion 4 includes tubes 2 and fins 3. The pair of header tanks 5 is attached to and disposed at both ends of the core portion 4.

The tubes 2 are pipes in which fluid (e.g., engine coolant) flows. Each of the tubes 2 has a flattened shape in cross-section and its longer diametrical direction in cross-section is parallel to an air flow direction. The tubes 2 are arranged in parallel in a horizontal direction in FIG. 1, such that their longitudinal directions (hereinafter, referred to as a tube longitudinal direction) correspond to a vertical direction in FIG. 1. Each of the fins 3 has a corrugated shape. Adjacent two of the fins 3 are joined to flattened surfaces of the tube 2 on its both sides to increase a heat-transfer area between the radiator 1 and air. Accordingly, the heat exchange between air and engine coolant flowing in the tubes 2 is promoted.

The header tanks 5 extend in a direction (horizontal direction) perpendicular to the tube longitudinal direction at both ends of the tubes 2 in the longitudinal direction, and communicate with the tubes 2. The header tank 5 includes a core plate 51, to which the tubes 2 are inserted and connected, and a tank body 52. The core plate 51 and the tank body 52 provide a tank space. More specifically, in the present embodiment, the header tanks 5 are arranged at upper and lower ends of the tubes 2 in FIG. 1.

Side plates 6 are provided for reinforcement of the core portion 4 at both end portions of the core portion 4 in a stacking direction of the tubes 2 (hereinafter, referred to as a tube stacking direction). The side plates 6 extend in the tube longitudinal direction, and both end portions of the side plates 6 in the tube longitudinal direction are connected to the header tanks 5.

A specific configuration of the header tanks 5 will be described below.

Figure 2:
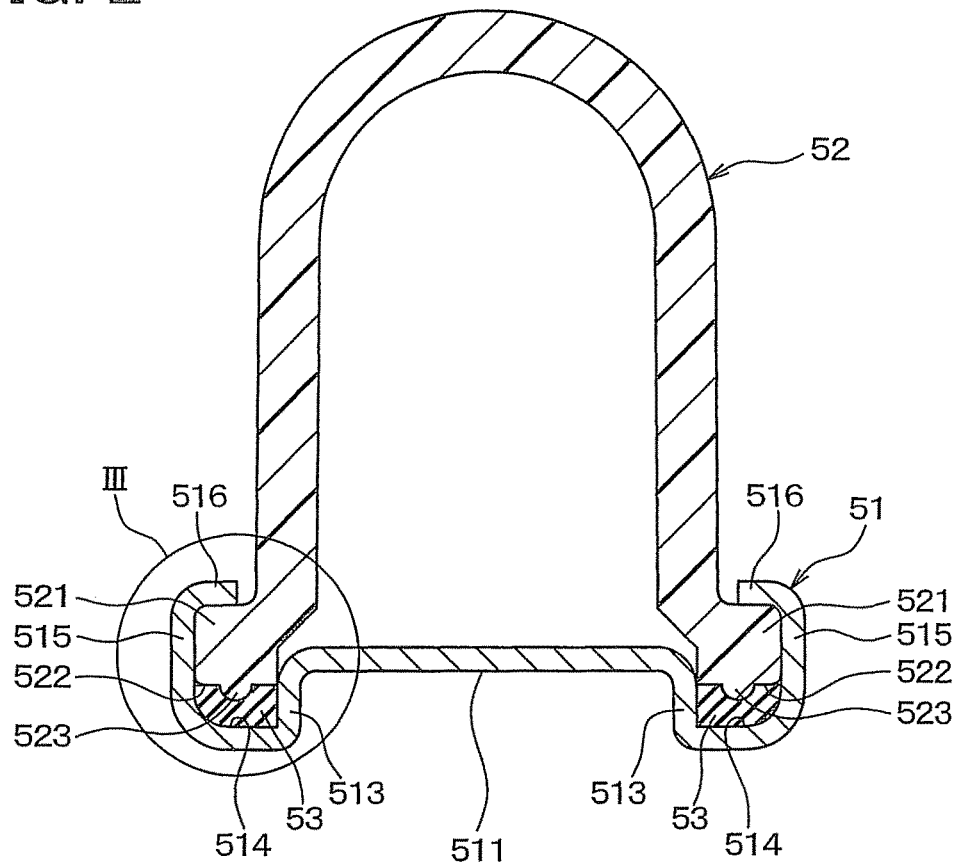
FIG. 2 is a cross-sectional view taken along a line II-II of FIG. 1.
Figure 3:
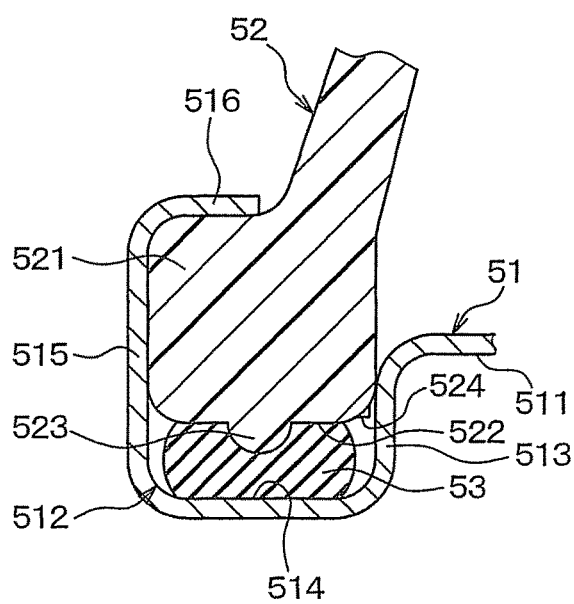
FIG. 3 is an enlarged view of a part III of FIG. 2.
Figure 4:
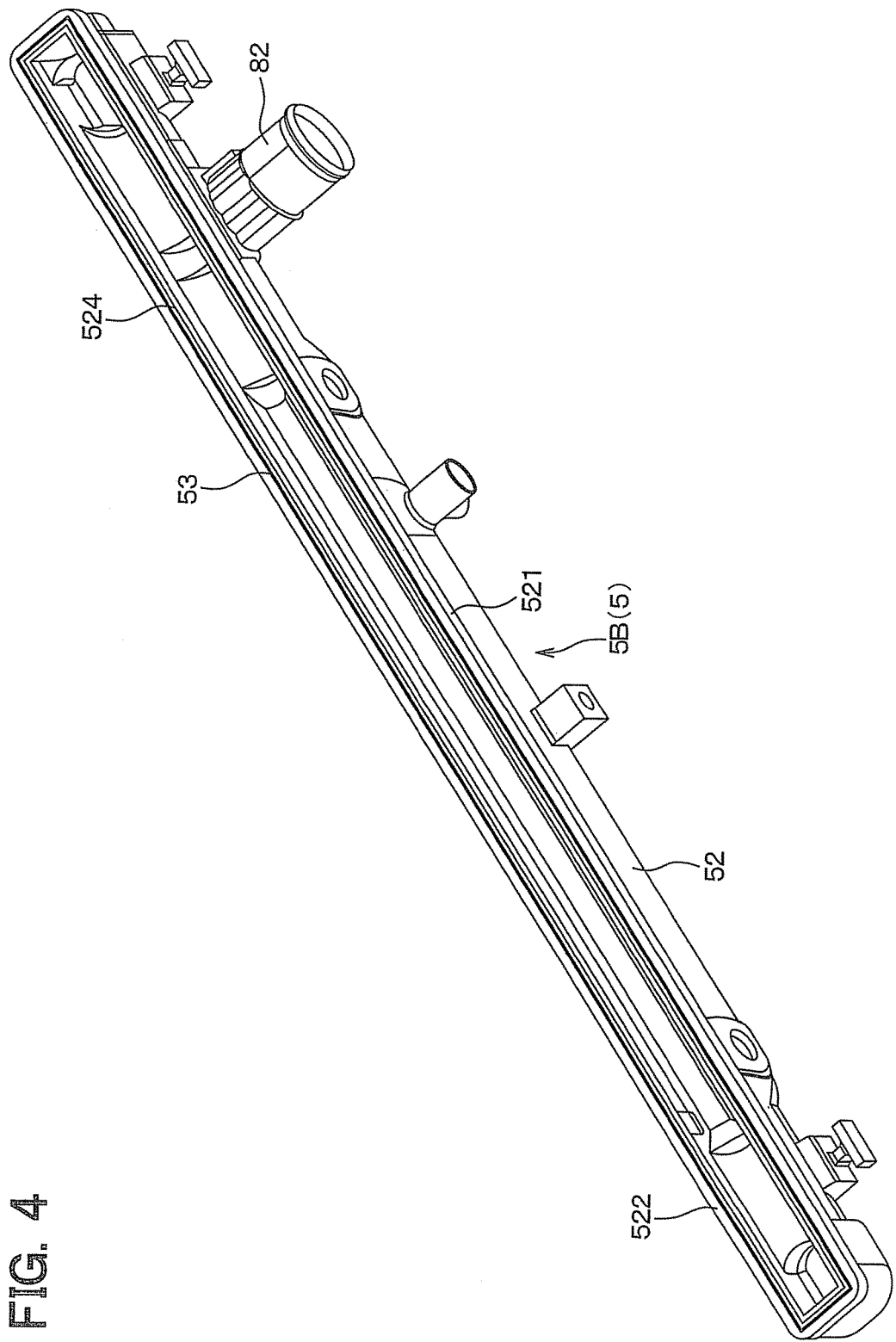
FIG. 4 is an exploded perspective view showing a tank body and a packing for the radiator according to the embodiment.

As shown in FIGS. 2 to 4, the header tank 5 includes the core plate 51, the tank body 52, and a packing 53. The tubes 2 and the side plates 6 are inserted and connected to the core plate 51. The core plate 51 and the tank body 52 define the tank space, which is an inner space of the header tank 5. The packing 53 is used as a sealing member for sealing between the core plate 51 and the tank body 52.

The core plate 51 is made of aluminum alloy, and the tank body 52 is made of resin such as glass-reinforced polyamide which is reinforced by using glass fiber. The core plate 51 is fixed to the tank body 52 by caulking. Specifically, a protrusion edge 516 of the core plate 51 is deformed plastically so as to be pressed against the tank body 52 with the rubber packing 53 inserted between the core plate 51 and the core tank body 52. The packing 53 of the present embodiment is made of elastically-deformable resin (rubber) and may correspond to a sealing member of the invention.

The core plate 51 includes a tube connection surface 511 to which the tubes 2 are connected. The tube connection surface 511 has several tube insertion holes (not shown) along the tube stacking direction for insertion and braze of the tubes 2. Moreover, the tube connection surface 511 has side-plate insertion holes (not shown) on both its end sides in the tube stacking direction for insertion and braze of the side plates 6.

A loop-shaped groove part 512 is formed along an entire circumference of the tube connection surface 511. A core plate 51-side end part (skirt part 521) of the tank body 52 and the packing 53 are inserted in the loop-shaped groove part 512 of the core plate 51. The groove part 512 includes three surfaces: a surface of an inner wall part 513, a core-side sealing surface 514, and a surface of an outer wall part 515. The inner wall part 513 is bent generally perpendicularly from the outer circumferential part of the tube connection surface 511 to extend in the tube longitudinal direction. The core-side sealing surface 514 is bent generally perpendicularly from the inner wall part 513 to extend in a direction perpendicular to the tube longitudinal direction. The outer wall part 515 is bent generally perpendicularly from the core-side sealing surface 514 to extend in the tube longitudinal direction. An end part of the outer wall part 515 has the several protrusion edges 516.

A core plate 51-side surface (hereinafter, referred to as a tank-side sealing surface 522) of the skirt part 521 of the tank body 52 has a loop shape to enclose the tank space when viewed from the core portion 4.

The packing 53 also has a loop shape so as to enclose the tank space when viewed from the core portion 4 (from a lower side in FIG. 2, and from an upper side in FIG. 4), i.e., the packing 53 is provided on an entire circumference of the skirt part 521. The packing 53 is formed integrally with the tank-side sealing surface 522 of the skirt part 521.

The tank-side sealing surface 522 has a projection part 523 projecting from the tank-side sealing surface 522 toward the packing 53. The projection part 523 provides positional stability of the packing 53 and securement of appropriate compressibility when the packing 53 is pressed against the projection part 523 and elastically compressed.

As shown in FIG. 3, the skirt part 521 has a protrusion portion 524 projecting from the skirt part 521 toward the core plate 51. The protrusion portion 524 is located radially inward of the packing 53 (on the tank space-side) and opposed to the inner wall part 513 of the core plate 51. The protrusion portion 524 encloses the tank space when viewed from the core portion 4 (from a lower side in FIG. 2, and from an upper side in FIG. 4), namely, the protrusion portion 524 is provided to surround the entire circumference of the skirt part 521. In other words, the protrusion portion 524 is provided on the entire circumference of the tank-side sealing surface 522 when viewed from the core portion 4. The protrusion portion 524 has a triangular shape in cross-section in the present embodiment, but may have a semicircular shape in cross-section.

As shown in FIG. 1, one of the pair of header tanks 5, which is located on an upper side of the core portion 4, is an upper header tank 5A. The other one of the pair of header tanks 5, which is located on a lower side of the core portion 4, is a lower header tank 5B. The upper header tank 5A has a coolant inlet 81, which communicates with the tank space of the upper header tank 5A to introduce engine coolant into the tank space. The lower header tank 5B has a coolant outlet 82, which communicates with the tank space of the lower header tank 5B to discharge engine coolant from the tank space of the lower header tank 5B.

A method of producing the header tank 5 of the radiator 1 according to the present embodiment will be described.

Figure 5:
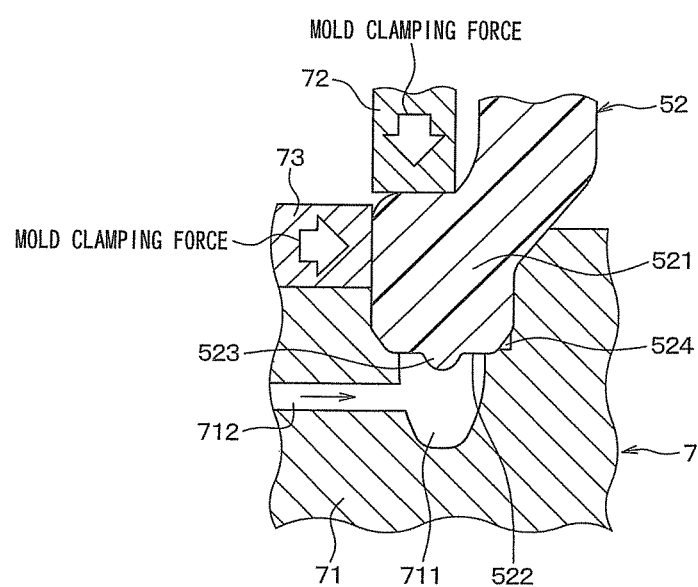
FIG. 5 is a schematic sectional view illustrating a main feature part of a method of making a header tank for the radiator according to the embodiment.

First, the tank body 52 is formed by resin molding such as, injection molding. Subsequently, as shown in FIG. 5, the skirt part 521 of the tank body 52 is inserted into a molding die 7.

More specifically, the molding die 7 includes a first die 71, a second die 72, and a third die 73. The first die 71 includes a cavity 711 having a shape that is the same as an outer shape of the packing 53. The second die 72 presses an upper surface of the skirt part 521 in FIG. 5 (a surface of the skirt part 521 opposite from the tank-side sealing surface 522). The third die 73 presses a lateral surface of the skirt part 521 (an outer side surface of the header tank 5).

The skirt part 521 of the tank body 52 is inserted into the first die 71 so that the tank-side sealing surface 522 of the skirt part 521 is exposed to the cavity 711 of the first die 71. After this, the skirt part 521 is clamped between the second and third dies 72 and 73 so that mold clamping of the skirt part 521 is performed. At this time, because the protrusion portion 524 of the main body 52 is compressed by the first die 71, the protrusion portion 524 is crushed by an inner wall surface of the first die 71.

Subsequently, rubber (elastically-deformable resin) as a material of the packing 53 is injected into the cavity 711 through a filling nozzle 712, which is provided at the first die 71, to fill the cavity 711 with the rubber. After the rubber is cooled, the first to third dies 71 to 73 are disassembled so that the tank body 52 is drawn from the dies 71 to 73. Accordingly, the packing 53 is integrated with the tank-side sealing surface 522 of the tank body 52.

Subsequently, the tank body 52 formed integrally with the packing 53 is attached to the core plate 51. Specifically, the skirt part 521 of the tank body 52 and the packing 53 are inserted into the groove part 512 of the core plate 51, and then the projection part 516 of the core plate 51 is deformed elastically to be pressed against the tank body 52, such that the core plate 51 is fixed to the tank body 52 by caulking.

As described above, when the packing 53 is formed integrally with the tank body 52, the skirt part 521 is inserted into the first die 71 and mold clamping of the skirt part 521 is performed. The skirt part 521 of the tank body 52 has the protrusion portion 524 on the radially inner side of the packing 53. Thus, the protrusion portion 524 is crushed by the inner wall surface of the first die 71. Hence, formation of an interspace between the tank body 52 and the first die 71 can be prevented by the protrusion portion 524. Accordingly, the material of the packing 53 can be prevented from leaking beyond the protrusion portion 524 when the material is injected into the cavity 711 of the first die 71. Furthermore, the mold clamping force does not need to be high because of an existence of the protrusion portion 524. Therefore, generation of burr of the packing 53 can be prevented with the mold clamping force kept low.

Instead of the protrusion portion 524 of the tank body 52, the first die 71 may have a protrusion portion projecting from the first die 71 toward the tank body 52 so that the protrusion portion of the first die 71 is crushed at the time of mold clamping. In this case, however, there are the following problems. (1) The first die 71 is easy to wear out. (2) A notch (crack) may be generated in the tank body 52 when the protrusion portion of the first die 71 is pressed on the tank body 52 because the tank body 52 is made of resin. Stress in the mold clamping is easy to concentrate on this notched part, and thus creep may be generated from the notched part. In the present embodiment, the tank body 52 has the protrusion portion 524 so as not to cause the above problems.

In the present embodiment, the skirt part 521 has the protrusion portion 524 on the radially inner side of the packing 53. Therefore, when the cavity 711 of the first die 71 is filled with the material of the packing 53, an outflow of the material of the packing 53 to the inside of the tank 5 beyond the protrusion portion 524 can be limited. Accordingly, during use of the radiator 1, mixing of a burr of the packing 53 into the coolant flowing in a cooling circuit can be limited.

Modifications of the above embodiment will be described. In the above-described embodiment, the example of arrangement of the protrusion portion 524 of the skirt part 521 radially inward of the packing 53 is described. However, a position of the protrusion portion 524 is not limited to this. The protrusion portion 524 may be located on the skirt part 521 radially outward of the packing 53, or may be located on the skirt part 521 radially both inward and outward of the packing 53.

Additional advantages and modifications will readily occur to those skilled in the art. The invention in its broader terms is therefore not limited to the specific details, representative apparatus, and illustrative examples shown and described.

What is claimed is:

1. A heat exchanger comprising:
a core portion including a plurality of tubes in which fluid flows;
a pair of header tanks arranged on both end sides of the core portion in a longitudinal direction of the plurality of tubes and extending in a direction perpendicular to the longitudinal direction of the plurality of tubes, wherein:
each of the pair of header tanks includes a core plate joined to the plurality of tubes, and a tank body made of resin; and
the core plate and the tank body define a tank space communicating with the plurality of tubes;
an elastically-deformable sealing member that is disposed at an end part of the tank body located adjacent to the core plate;
the sealing member has a loop shape to enclose the tank space and is formed integrally with the end part of the tank body;
the end part of the tank body includes a protrusion portion inward of the sealing member in a radial direction of the sealing member;
the protrusion portion is provided continuously along the end part of the tank body to enclose the tank space and projects from the end part of the tank body over an entire circumference of the end part of the tank body toward the core plate;
a height of the sealing member from the tank body is larger than a height of the protrusion portion from the tank body;
the protrusion portion is separated from the sealing member;
the core plate includes:
a tube connection surface to which the plurality of tubes are joined; and
a groove part provided on an outer circumferential part of the tube connection surface and recessed from the tube connection surface, the groove part accommodating the end part of the tank body and an entire part of the sealing member;
the protrusion portion is positioned inside the groove part; and
the end part of the tank body includes:
an inner surface located on a radially inner side of the end part of the tank body;
a contact surface contacting the sealing member; and
a curved surface that is curved and connects the inner surface and the contact surface, and
an apex of the protrusion portion is located within a space enclosed by a vertical plane extending from the inner surface of the end part, a horizontal plane extending from the contact surface of the end part, and the curved surface of the end part.

2. The heat exchanger according to claim 1, wherein the protrusion portion has one of a triangular shape and a semicircular shape in cross-section.

3. The heat exchanger according to claim 1, wherein the protrusion portion is disposed inside of the loop shape which encloses the tank space.

4. The heat exchanger according to claim 1, wherein the end part of the tank body further includes a projection part, separate from the protrusion portion, the projection part being radially outward from the protrusion portion in the radial direction of the sealing member.

5. The heat exchanger according to claim 4, wherein the projection part is entirely covered by the sealing member.

6. The heat exchanger according to claim 4, wherein a surface of the end part of the tank body not forming the protrusion portion or the projection part is disposed between the protrusion portion and the projection part.

7. The heat exchanger according to claim 4, wherein the projection part extends from a surface of the end part of the tank body, the projection part being entirely covered by the sealing member, the surface of the end part of the tank body being partially covered by the sealing member.

8. The heat exchanger according to claim 1, wherein the protrusion portion is disposed immediately adjacent an inner surface of the end part of the tank body.

9. The heat exchanger according to claim 1, wherein a non-linear surface of the end part of the tank body is disposed on opposite sides of the protrusion portion.

10. The heat exchanger according to claim 1, wherein an open space is disposed between the sealing member and the protrusion portion.

11. The heat exchanger according to claim 1, wherein:
the groove part includes a sealing surface located on a bottom of the groove part and contacting the sealing member; and
the protrusion portion is positioned between the tube connection surface and the sealing surface in a depth direction of the groove part.

12. The heat exchanger according to claim 11, wherein: the groove part further includes:
an inner wall part connecting an inner circumferential part of the sealing surface and the outer circumferential part of the tube connection surface; and
an outer wall part extending from an outer circumferential part of the sealing surface toward an opening of the groove part; and
the protrusion portion is positioned between the inner wall part and the sealing member.

13. The heat exchanger according to claim 12, wherein the sealing member does not directly contact the protrusion portion.

14. The heat exchanger according to claim 1, wherein an entire part of the protrusion portion is positioned inside the groove part.

15. The heat exchanger according to claim 1, wherein the end part of the tank body defines a first planar annular surface, a second planar annular surface and a protrusion part disposed between the first and second planar annular surfaces, the protrusion portion being entirely disposed radially inward from both the first and second planar annular surfaces.

16. The heat exchanger according to claim 15, wherein the sealing member does not directly contact the protrusion portion.

17. The heat exchanger according to claim 1, wherein the end part of the tank body includes a protrusion part separate from the protrusion portion, the protrusion part directly contacting the sealing member.

18. The heat exchanger according to claim 1, wherein the protrusion portion is spaced apart from the core plate and positioned inside the groove part.

19. A heat exchanger comprising:
a core portion including a plurality of tubes in which fluid flows;
a pair of header tanks arranged on both end sides of the core portion in a longitudinal direction of the plurality of tubes and extending in a direction perpendicular to the longitudinal direction of the plurality of tubes, wherein:
each of the pair of header tanks includes a core plate joined to the plurality of tubes, and a tank body made of resin; and
the core plate and the tank body define a tank space communicating with the plurality of tubes;
an elastically-deformable sealing member that is disposed at an end part of the tank body located adjacent to the core plate;
the sealing member has a loop shape to enclose the tank space and is formed integrally with the end part of the tank body;
the end part of the tank body includes a protrusion portion inward of the seating member in a radial direction of the sealing member;
the protrusion portion is provided continuously along the end part of the tank body to enclose the tank space and projects from the end part of the tank body over an entire circumference of the end part of the tank body toward the core plate;
a height of the sealing member from the tank body is larger than a height of the protrusion portion from the tank body;
the protrusion portion is separated from the sealing member;
the core plate includes:
a tube connection surface to which the plurality of tubes are joined; and
a groove part provided on an outer circumferential part of the tube connection surface and recessed from the tube connection surface, the groove part accommodating the end part of the tank body and an entire part of the sealing member; and
the protrusion portion is spaced apart from and not in contact with the core plate and positioned inside the groove part.

* * * * *